April 25, 1939.  A. A. WEGNER  2,156,248
ARTICLE TRANSFER APPARATUS FOR CONVEYERS
Filed July 29, 1937   7 Sheets-Sheet 6

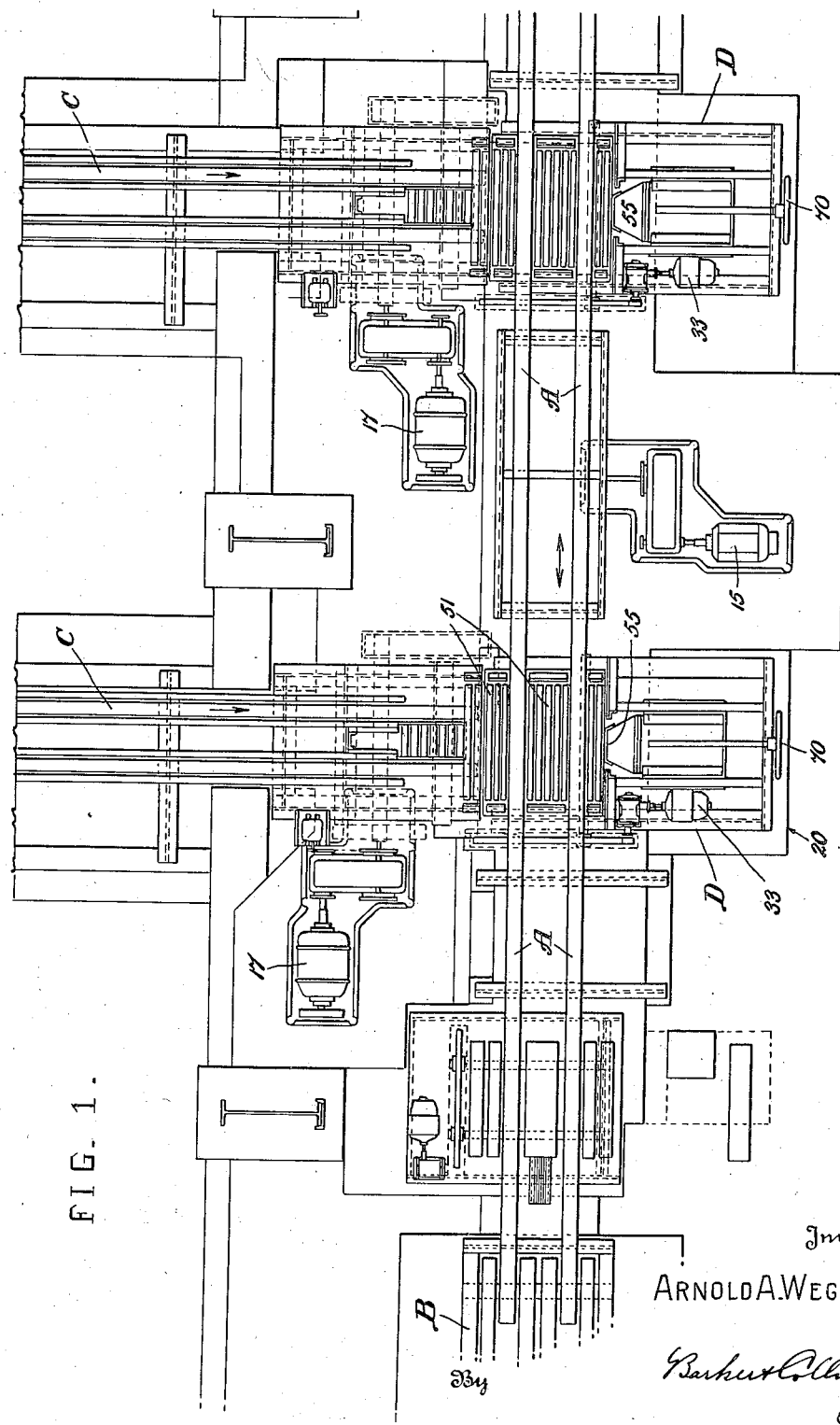

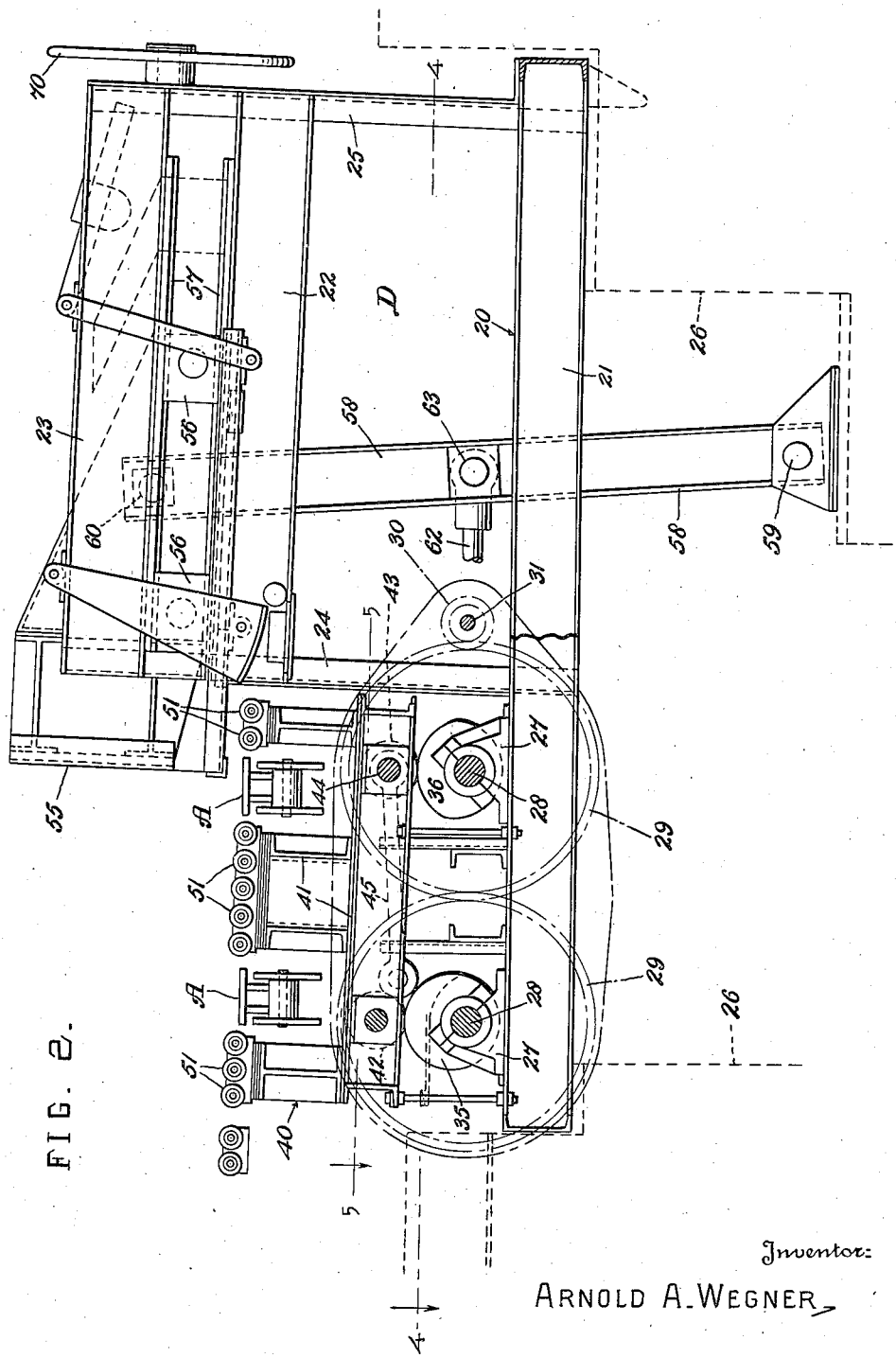

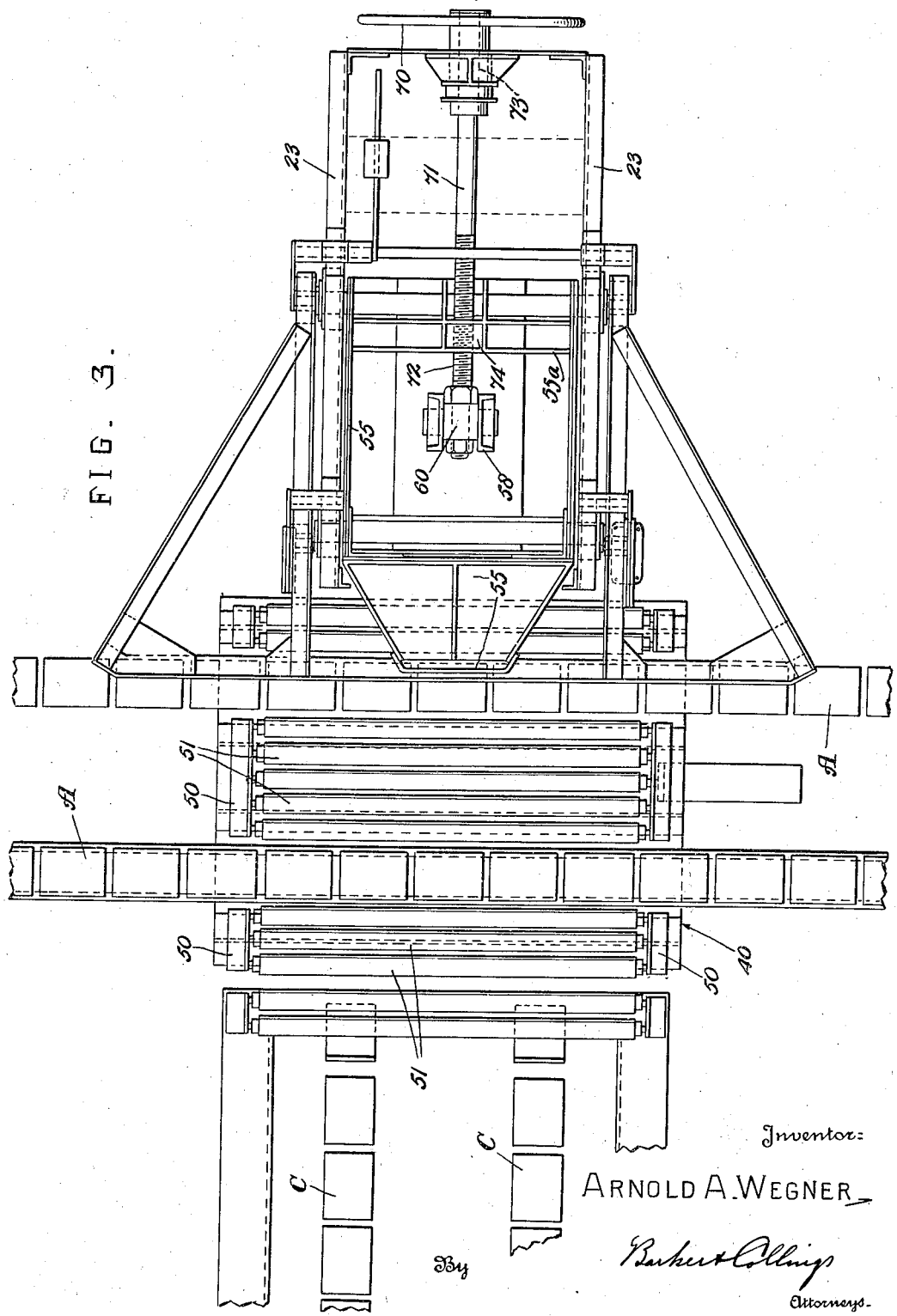

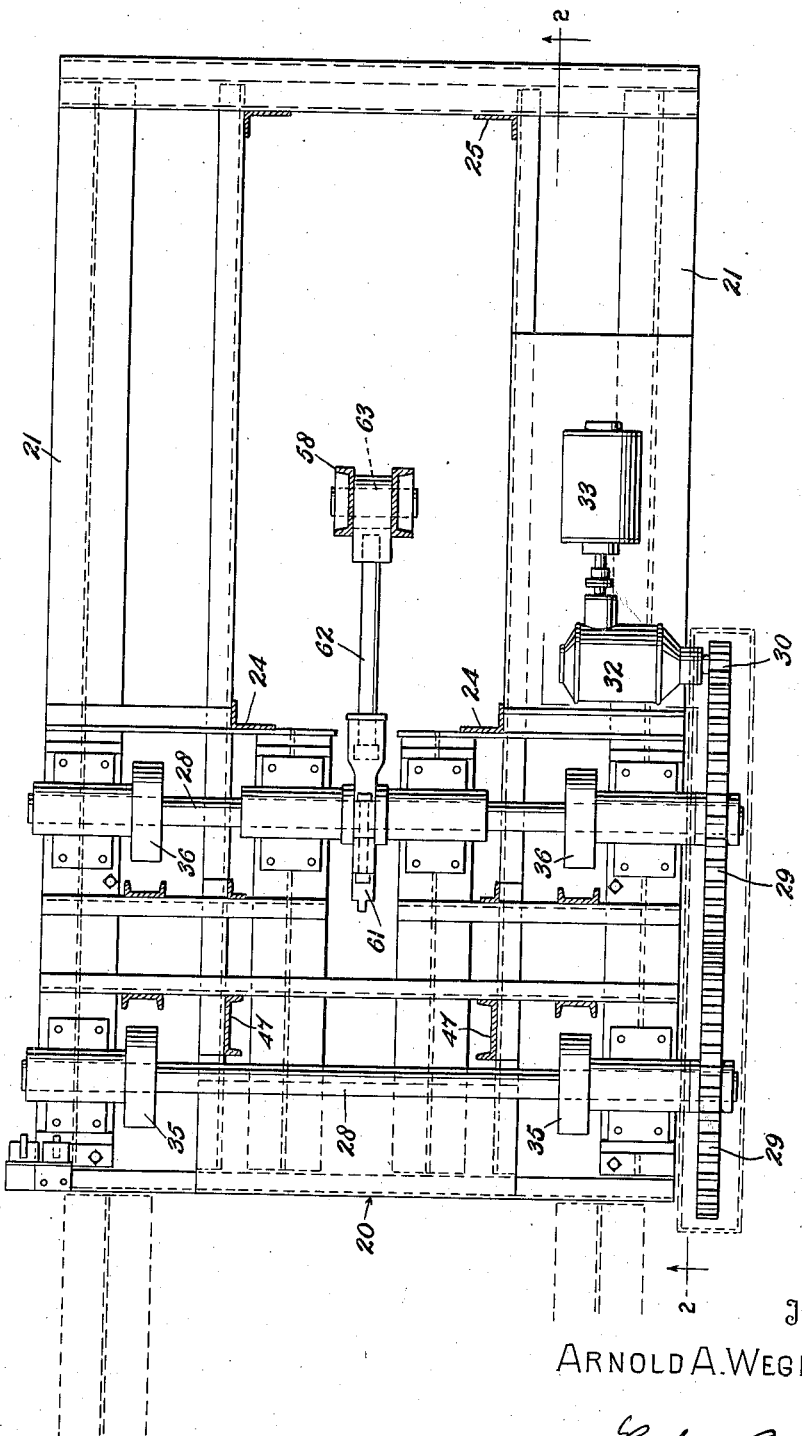

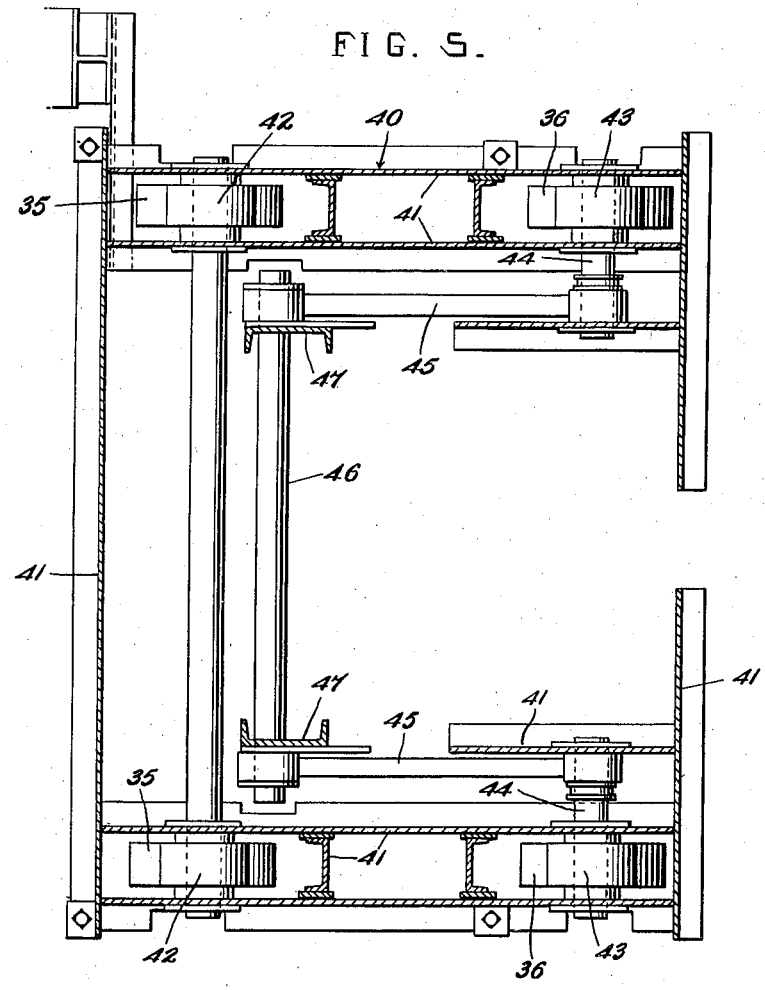
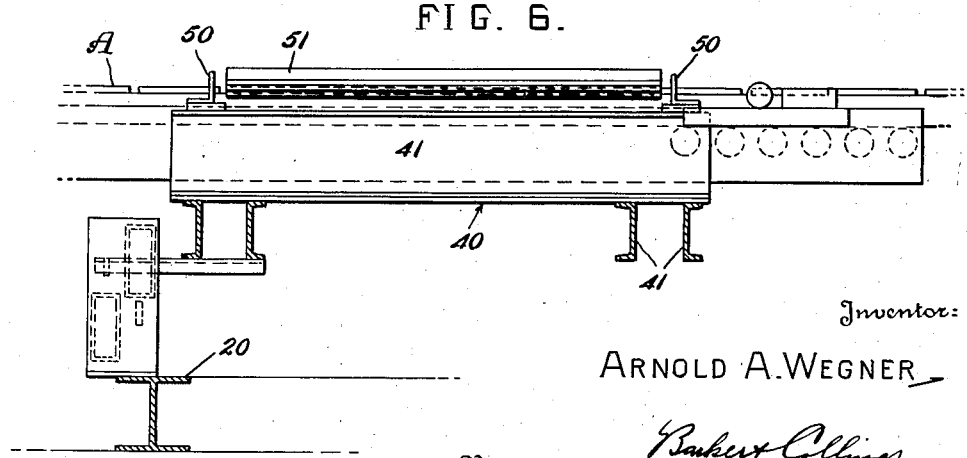

Inventor:
ARNOLD A. WEGNER
By Barker + Collins
Attorneys

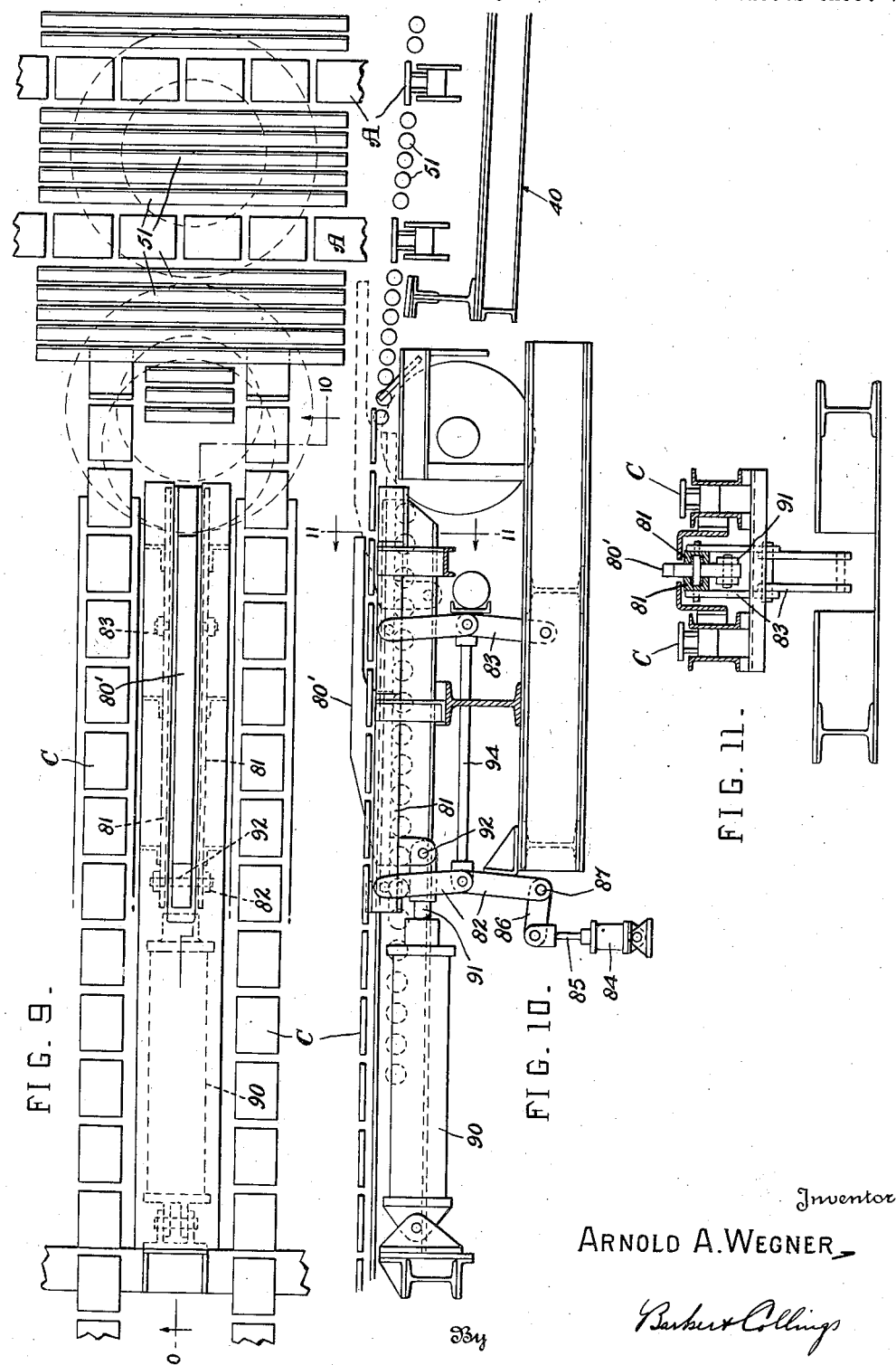

Patented Apr. 25, 1939

2,156,248

UNITED STATES PATENT OFFICE 2,156,248

ARTICLE TRANSFER APPARATUS FOR CONVEYERS

Arnold A. Wegner, Milwaukee, Wis., assignor to Chain Belt Company, Milwaukee, Wis., a corporation of Wisconsin Application July 29, 1937, Serial No. 156,384

6 Claims. (Cl. 198—20)

The invention relates to article transfer apparatus for conveyers, and has for its principal object to provide an improved mechanism for automatically transferring articles being transported by a feed or tributary conveyer to a main conveyer traveling in a direction at a substantial angle to the direction of travel of said feed conveyer, without stopping the movement of either conveyer. Generically the apparatus is of the type comprising a table positioned at the junction of the conveyers, power driven to rise above the plane of the main conveyer upon the approach of an article on the feed conveyer to receive such article and carry it to a point above said main conveyer, after which the table is automatically lowered to deposit the article upon the main conveyer, which then takes up the transportation.

The invention also includes means for properly positioning the articles upon the main conveyer, such means being adjustable to accommodate articles of varying sizes, and being retractable so as not to interfere with the passage of articles deposited on the main conveyer from other feed conveyers where two or more of the latter are employed.

With the above and other objects in view which will appear as the description proceeds, the invention consists in the novel details of construction, and combinations and arrangements of parts, more fully hereinafter disclosed and particularly pointed out in the appended claims.

Referring to the accompanying drawings forming a part of this specification, in which like reference characters designate like parts in all the views:—

Figure 1 is a fragmentary plan view, more or less diagrammatic, of a typical installation of a main conveyer and two feed conveyers, there being transfer mechanism constructed and arranged in accordance with the invention located at the points at which the said feed conveyers discharge to the main conveyer;

Fig. 2 is an enlarged side elevational view of the transfer apparatus, partly broken away and in section on approximately the plane indicated by the line 2—2 of Fig. 4, the table being illustrated in its raised position for receiving an article from the feed conveyer;

Fig. 3 is a plan view of the parts shown in Fig. 2;

Fig. 4 is a sectional plan view, taken approximately on the plane indicated by the line 4—4 of Fig. 2, looking down;

Fig. 5 is a similar view, taken approximately on the plane indicated by the line 5—5 of Fig. 2, looking down;

Fig. 6 is a partial front elevational view of the table, as seen from the left of Fig. 2;

Fig. 9 is a plan view of a modified form of mechanism for aiding the transfer of articles from the feed conveyer to the transfer table;

Fig. 10 is a longitudinal sectional elevational view of the parts illustrated in Fig. 9, taken approximately on the plane indicated by the line 10—10 of said figure; and Fig. 11 is a transverse sectional view, taken approximately on the plane indicated by the line 11—11 of Fig. 10.

Figure 7:
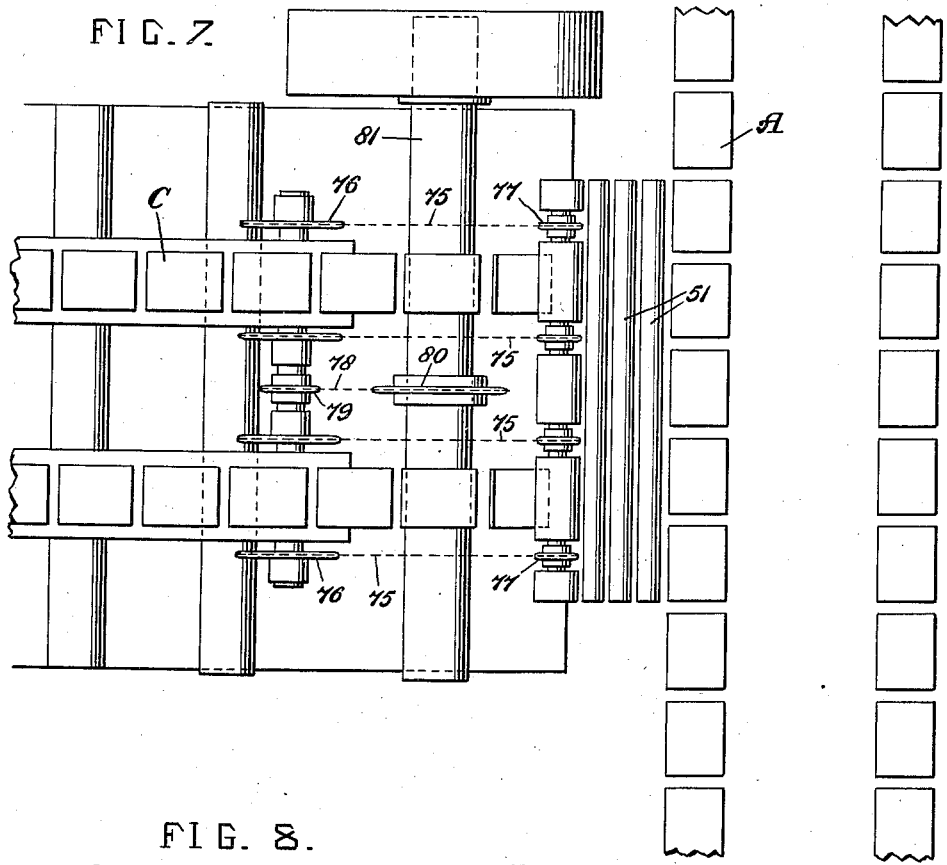
Fig. 7 is a plan view of one form of mechanism for assisting transfer of the articles from the feed conveyer to the transfer table.

In the typical installation illustrated in Figure 1 there is shown a main or receiving conveyer A of the endless chain multiple strand type which is adapted to be driven in either direction by a motor 15 and deliver the articles being transported to auxiliary conveyers B arranged at either end of the said conveyer A (only one being shown in the portion of the apparatus here illustrated), which auxiliary conveyers constantly run in opposite directions and are driven by suitable motors, not shown. A plurality of feeding conveyers C likewise of the endless chain multiple strand type are disposed at substantially right angles to the main conveyer A and are driven by motors 17 in the direction indicated by the arrows in Figure 1, whereby their upper or carrying surfaces move toward the main conveyer A to transport the articles from a supply point to the said main conveyer.

At the junction of each feeding or tributary conveyer C with the main conveyer A there is provided a transfer table apparatus D constituting the gist of the present invention and which are arranged to receive the articles from the discharge end of the feed or tributary conveyer C, convey them to a point above the spaced strands of the main conveyer A, and then deposit them upon the said strands so that the transfer from the feed conveyer C to the main conveyer will take place without the necessity of stopping the movement of either of the said conveyers.

Referring now more particularly to Figures 2 to 6, inclusive, the transfer table mechanism comprises a stationary frame 20 composed of the horizontal frame members 21, 22, 23, and the vertical frame members 24 and 25, all rigidly connected together and suitably supported upon a concrete, masonry or brick foundation 26. Mounted upon the horizontal frame members 21 are the spaced bearings 27 in which are journalled the transversely extending shafts 28 carrying at one end the intermeshing gears 29 one of which engages a pinion 30 mounted upon the drive shaft 31 of a speed reducing mechanism 32 which is driven by a suitable motor 33, see Figure 4. The shafts 28 are thus driven in opposite directions and the said shafts are provided respectively with the pairs of cams 35 and 36 rigid with the said shafts and rotatable therewith.

Positioned above the shafts 28 and cams 35 and 36 is the transfer table 40 comprising a structural steel frame 41 and having suitable rollers 42 and 43 carried thereby and engaging the peripheries of the cams 35 and 36, as will be readily understood from Figures 2, 4 and 5. The transfer table 40 may be said to float upon the cams 35 and 36, and as will be readily understood from Figure 2, cams 36 are of a different contour from cams 35 so that as the shafts 28 are rotated the cams 35 will raise the left-hand end of the transfer table 40 further than the cams 36 elevate the right-hand end of the said table. It thus results that the table will be elevated from its lowered position in which it is substantially horizontal to an inclined position in which its left-hand end, as viewed in Figure 2, is higher than its right-hand end, although the latter will have been elevated to some extent from the lowest position of the table. In this connection it will be observed that the lower portions of cams 35 and 36, as viewed in Fig. 2, are substantially identical, and since the cams are rotated at the same speeds it results that during the first portion of the raising movement, and during the last portion of the lowering movement, both ends of the table 40 will be moved upwardly or downwardly in uniformity and the table maintained in a horizontal plane. On the other hand, the upper portions of cams 36, as viewed in Fig. 2, are cut away while the corresponding portions of cams 35 are not, so that during the latter part of the raising operation and the first part of the lowering operation, movement of the left hand end of the table will be greater than movement of the right hand end, with the result that the table will be tilted from and to horizontality during this part of the cycle.

The shafts 44 upon which the rollers 43 are journalled have mounted upon them one end of a pair of link members 45, see Figures 2 and 5, The other ends of which link members are secured to a shaft 46 mounted in upright frame members 47 of the stationary frame 20. These links thus permit the upward and downward movements of the table 40 while at the same time preventing horizontal movement thereof, as will be readily understood.

Journalled in suitable supporting members 50 secured to the table frame 41 are a plurality of sets of article supporting rolls 51, which, as will be clear from Figures 2 and 3, are disposed to either side of and between the spaced strands of the main conveyer A. The parts are so constructed and arranged that when the table 40 is in its lowered position, that is when the cams 35 and 36 are in positions approximately 180° removed from those shown in Figure 2, the rolls 51 will occupy a substantially horizontal plane somewhat below the plane of the upper or carrying surface of the main conveyer A, whereas when the said cams 35 and 36 are in the positions shown in Figure 2 the said rolls are disposed in a plane which is somewhat above and transversely inclined with respect to the plane of the carrying surface of the conveyor A as clearly shown in Figure 2.

The feeding or tributary conveyers C are arranged to operate with their upper or carrying surfaces in a plane somewhat higher than that of the carrying surfaces of the conveyer A and when the table 40 is in its upper inclined position, the roll 51 adjacent the receiving edge of the table, that is the left-hand side as viewed in Figure 2, is substantially alined with the plane of the carrying surface of the tributary conveyer so that articles supported by the said tributary conveyer strands and moved toward the main conveyer A may be smoothly transferred from the tributary conveyer onto the transfer table rolls 51. The said rolls 51 are ordinarily not power driven but by reason of the inclination of the table and rolls as the articles move onto the latter, said articles will move under the influence of gravity to a position above the strands of the conveyer A. In this position they contact, a stop or abutment 55, to be described more in detail later, whereupon the table 40 is lowered through rotation of the cams 35 and 36 to cause the articles to be deposited upon the carrying surface of the conveyer A which then takes up the transportation in whichever direction it may happen to be driven at the time. The movements of the table 40 are preferably automatically controlled through suitable limit switches, not shown, but actuated by the articles in their movements, which switches in turn control the flow of current to the driving motor 33.

The stop or bumper 55, referred to above, is slidably mounted by means of suitable blocks 56 in slides or guides 57 mounted upon the horizontal frame members 22 and 23 of the stationary frame 20 for horizontal reciprocating movements. A rock arm 58 has its lower end pivoted as at 59 upon the fixed support 26, while its upper end is pivotally connected as at 60 to the bumper structure through an adjusting screw 71. The shaft 28 which carries the cams 36 is provided intermediate its ends with an eccentric and strap 61, see Figure 4, to which is connected one end of an adjustable rod 62 the other end of which is pivotally connected as at 63 to the rock arm 58. It results from this construction that as the table is raised and lowered through rotation of the shafts 28 and cams 35 and 36 the eccentric 61 and eccentric rod 62 will cause oscillation of the rock arm 58 which will be transmitted through the connection 60 to the bumper 55, the arrangement being such that as the table moves upwardly the bumper 55 will be moved toward the left, as viewed in Figure 2, to the position shown therein, in which it will accurately position the article received upon the rolls 51 above the strands of the conveyer A. As rotation of the shafts 28 and cams 35 and 36 continues to lower the table, the eccentric 61 and rock arm 58 will retract or move the bumper 55 toward the right as viewed in Figure 2, and out of engagement with the article which has just been transferred to the conveyer A. Thus, after the bumper 55 has performed its positioning function it will be moved to a retracted position in which it will not interfere with the travel of the article as it is moved along by the conveyer A. This retraction of the bumper 55 is also of importance in case of installations having a plurality of feed or tributary conveyers C as shown in Figure 1, so that the bumper of one transfer table will not interfere with articles deposited upon conveyer A by the other transfer table when such conveyer is moved in a direction to transport said articles past a table other than that which has deposited them upon the conveyer.

In order that the apparatus may accommodate articles of different sizes provision is made for adjusting the stop position of the bumper 55 including hand wheel 70 mounted upon a horizontally disposed shaft 71 longitudinally slidably journalled at 73 in the upper part of the framework 20 and having a threaded connection 72 with a nut 74 fixedly carried by a transverse bumper member 55ª, see Figures 2 and 3. The forward end of the screw shaft 71 is rotatably but non-slidably journalled in the pivotal connecting member 60 carried by the upper end of the rock arm 58. By this means although the travel of the bumper 55 will always remain the same its in and out positions may be varied so as to accurately position articles of different sizes upon the table rolls 51 with respect to the strands of the conveyer A, as will be readily understood.

Figure 8:
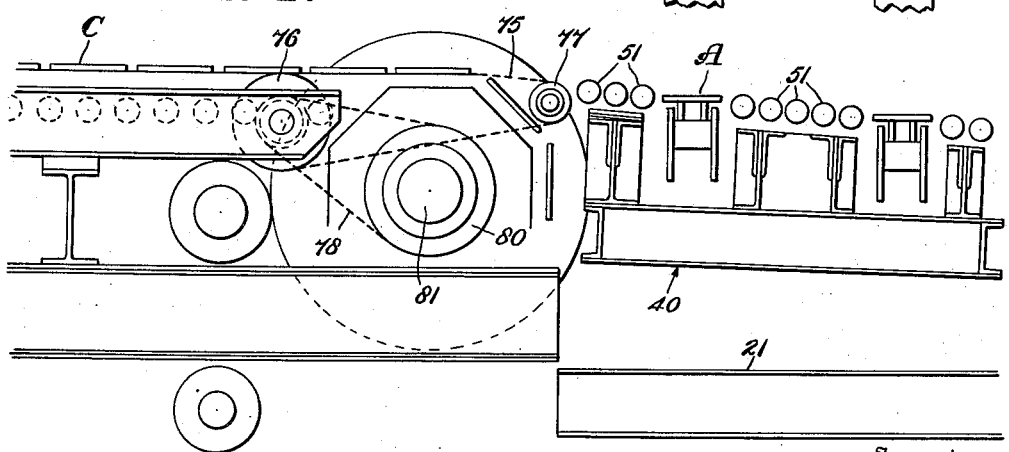
Fig. 8 is a side elevational view of the parts shown in Fig. 7.

While for many purposes the inclination of the table rolls 51 in their elevated position is sufficient to produce a smooth transfer of articles from the tributary conveyer C onto the transfer table, in some instances, as for example in the transfer of large rolls of hot sheet metal coming from a rolling mill and which rolls are standing upon end, there may be a tendency for the rolls to stick at the point of transfer from the conveyer C to the transfer table 40. In order to overcome such tendency additional means may be provided at the discharge end of the tributary conveyer C, one form of which is illustrated in Figures 7 and 8. The mechanism here shown more or less diagrammatically comprises a plurality of short conveyer chains 75 passing around suitable sprockets 76 and 77 arranged to either side of and between the strands of the conveyer C and driven by chain 78 and sprockets 79 and 80 from the shaft 81 of the conveyer C. As will be readily understood from these figures the said auxiliary chain 75 will engage the bottom surface of the article as it approaches the discharge point of the conveyer C and will assist in transferring the said article from the said conveyer onto the table rolls 51.

In Figures 9, 10 and 11 there is shown a somewhat modified form of apparatus for preventing sticking of the articles as they are discharged from the conveyer C onto the transfer table. In this construction a pusher member 80' is slidably mounted in horizontal guides 81 which in turn are mounted upon a pair of toggles 82 and 83. A fluid pressure cylinder 84 is provided having a suitable piston carried by a piston rod 85 which is connected to a rock arm 86 rigid with the shaft 87 to which is also rigidly connected one arm of the toggle 82. A second fluid pressure cylinder 90 is provided having a piston carried by a piston rod 91 which is connected as at 92 to the pusher member 80'. In the normal position of the parts the toggles 82 and 83, which are interconnected by a rod 94, are broken by having been moved toward the left, as viewed in Figure 10, so as to lower the guides 81 and with them the pusher member 80' so that the articles being transported by the conveyer C may freely pass above the said pusher member. Should an article stick, however, as it is being discharged from the conveyer, an operator may admit fluid to the cylinder 84 thereby causing its piston and piston rod to return the toggles to the positions shown in Figure 10 and elevate the pusher member 80', after which fluid may be admitted to the cylinder 90 to cause its piston and rod 91 to move the pusher 80' from the full line position shown in said Figure 10 to the dotted line position shown therein. This movement will, of course, bring the pusher member into engagement with the article and cause it to positively move the same onto the table rolls 51 into its position above the conveyer A. Upon exhaust of the fluid from the respective cylinders or admission of fluid to the other ends thereof the pusher 80' will be retracted and it along with its guides will again be lowered.

While one form of the invention has been illustrated and described it is obvious that those skilled in the art may vary the details of construction as well as the precise arrangement of parts without departing from the spirit of the invention and therefore it is not wished to be limited to the above disclosure except as may be required by the claims.

What is claimed is:

1. In article transfer apparatus for plural conveyer systems, the combination with a receiving conveyer and a feeding conveyer disposed at an angle thereto, of a pair of spaced shafts journalled below said conveyers; cam means mounted upon each of said shafts; a transfer table resting upon said cam means, arranged to receive articles from said feeding conveyer and transfer them to said receiving conveyer; and means for rotating said shafts and cam means, the latter being arranged to raise and lower both ends of said table uniformly during one portion of their cycle, and to raise or lower one end of the table faster than the other during another portion of said cycle.

2. In article transfer apparatus for plural conveyer systems, the combination with a receiving conveyer and a feeding conveyer disposed at an angle thereto, of a pair of spaced shafts journalled below said conveyers; cam means mounted on each of said shafts; a transfer table resting upon said cam means, arranged to receive articles from said feeding conveyer and transfer them to said receiving conveyer; means for synchronously rotating said shafts and cam means to raise and lower said table, the cams upon both of said shafts having portions arranged during the first part of the raising movement and the last part of the lowering movement to raise and lower both ends of the table uniformly and maintain the latter substantially horizontal, said cams having other portions arranged during the latter part of the raising movement and the first part of the lowering movement to raise and lower one end of the table slower than the other, thereby tilting it from and to horizontality; and means for retaining the table in position upon the cams.

3. In article transfer apparatus for plural conveyer systems which include a receiving conveyer and a feeding conveyer disposed at an angle thereto, a supporting frame adapted to be positioned at the junction of said conveyers; a transfer table mounted on said frame for movement between a position in which it may receive an article from said feeding conveyer and one in which it may deposit such article on said receiving conveyer; means for moving said table between said positions; means arranged to be contacted by an article as it moves onto said table from the feeding conveyer and properly position it for deposit upon the receiving conveyer; and means arranged to operate in synchronism with the movement of said transfer table to article-depositing position to retract said article-positioning means after it has performed its positioning function.

4. In article transfer apparatus for plural conveyer systems which include a receiving conveyer and a feeding conveyer disposed at an angle thereto, a supporting frame adapted to be positioned at the junction of said conveyers; a transfer table mounted on said frame for movement between a position in which it may receive an article from said feeding conveyer and one in which it may deposit such article upon said receiving conveyer; power means for alternately moving said table between said positions; a bumper slidably mounted on said frame arranged in one position to be contacted by and properly position an article on said transfer table for deposit on said receiving conveyer; a rock arm connected to said bumper; and connections between said rock arm and table moving means arranged to retract the bumper from the article after it has performed its positioning function.

5. In article transfer apparatus for plural conveyer systems which include a receiving conveyer and a feeding conveyer disposed at an angle thereto, a supporting frame adapted to be positioned at the junction of said conveyers; a transfer table mounted on said frame for movement between a position in which it may receive an article from said feeding conveyer and one in which it may deposit such article upon said receiving conveyer; power means including a shaft for alternately moving said table between said positions; a bumper slidably mounted on said frame arranged in one position to be contacted by and properly position an article on said transfer table for deposit on said receiving conveyer; a rock arm connected to said bumper; and connections between said rock arm and table moving means including an eccentric on said shaft arranged to retract the bumper from the article after it has performed its positioning function.

6. In article transfer apparatus for plural conveyer systems which include a receiving conveyer and a feeding conveyer disposed at an angle thereto, a supporting frame adapted to be positioned at the junction of said conveyers; a transfer table mounted on said frame for movement between a position in which it may receive an article from said feeding conveyer and one in which it may deposit such article on said receiving conveyer; means for alternately moving said table between said positions; means mounted on said frame arranged to be contacted by an article as it moves onto said table and thereby properly position it for deposit upon the receiving conveyer; means for retracting said article-positioning means after it has performed its positioning function; and an adjustable connection between said retracting means and said positioning means, whereby the contact position of the latter may be varied to accommodate articles of various sizes.

ARNOLD A. WEGNER.